Dec. 8, 1964     N. C. ORMES     3,160,216
ROOF VIBRATING MACHINE
Filed April 18, 1963     2 Sheets-Sheet 1

Ned C. Ormes
INVENTOR.

Dec. 8, 1964  N. C. ORMES  3,160,216
ROOF VIBRATING MACHINE
Filed April 18, 1963  2 Sheets-Sheet 2
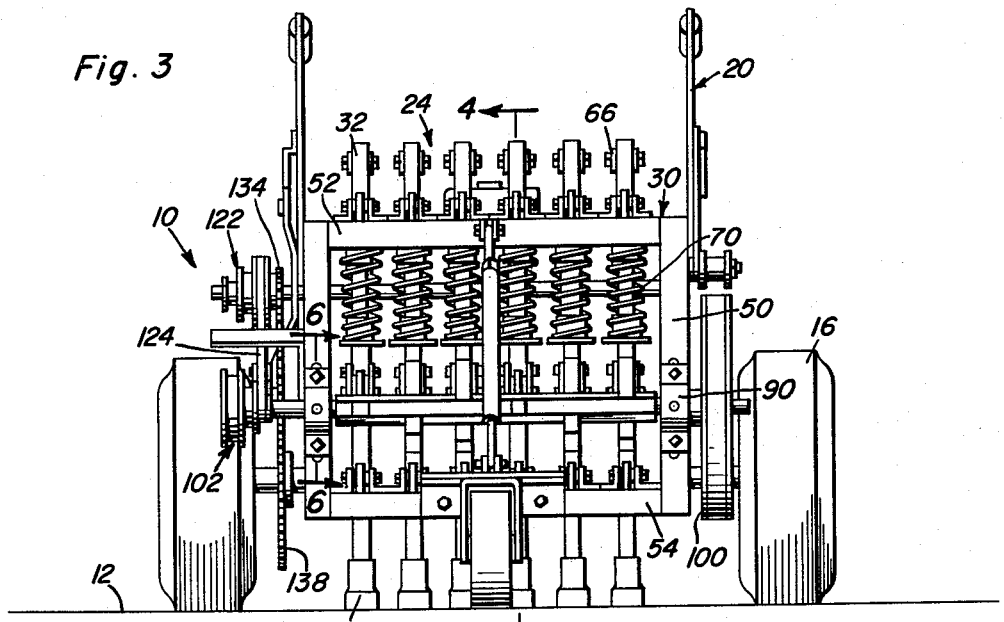
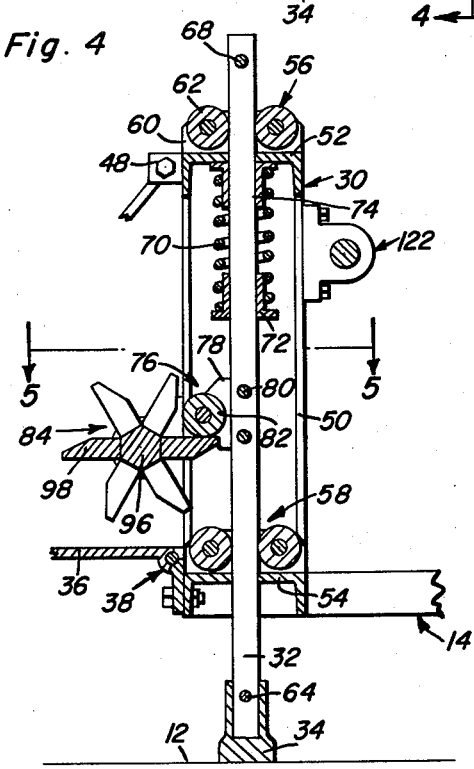
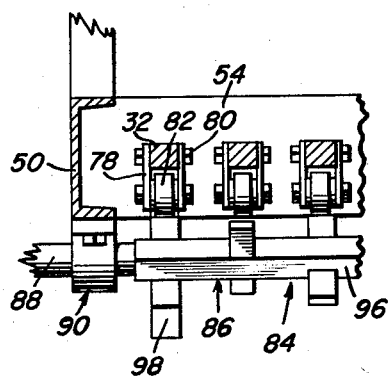
Ned C. Ormes
INVENTOR.

United States Patent Office 3,160,216
Patented Dec. 8, 1964

3,160,216
ROOF VIBRATING MACHINE
Ned C. Ormes, 2425 5th Ave. S., Nashville, Tenn.
Filed Apr. 18, 1963, Ser. No. 273,896
10 Claims. (Cl. 173—24)

This invention relates to a device for vibrating a surface such as a roof top.

A primary object of the present invention is to provide a vibrating machine whereby the surface of a roof may be vibrated for removal of roof surface gravel, slag, felts, etc. in connection with either the partial repair of a roof surface or complete replacement of a roof surface.

Another object of the present invention is to provide a vibrating machine which is particularly suited for varied vibrating load requirements and rugged and durable operation.

In accordance with the foregoing objects, the vibrating machine of the present invention includes a mobile frame assembly supported between a pair of traction wheels and an adjustably positioned dirigible caster wheel assembly whereby the mobile frame may be adjustably spaced above the surface being vibrated. A tamping assembly is therefore mounted by the mobile frame adjacent to the dirigible caster wheel so that adjustment of the caster wheel relative to the mobile frame will be operative to adjust the load-engaging condition of the tamping assembly as well as to facilitate steering of the mobile frame when the machine is vibrating.

As a further object of the present invention in accordance with the foregoing objects, the machine is mounted on a mobile frame with a prime mover disposed substantially above the traction wheels for support thereof in spaced relation to the tamping assembly so that the major portion of the vibrational forces will be confined to the forward portion of the mobile frame. Selectively controlled transmission facilities are provided which drivingly connect the prime moved to the tamping assembly for operation thereof as well as to effect movement of the mobile frame through the traction wheels. Accordingly, flexible drive mechanisms are provided which drivingly interconnect the prime mover to the tamping assembly and the tamping assembly to the traction wheels with belt tightener mechanisms arranged to render the flexible drive mechanisms sequentially operative.

The vibrating machine of the present invention also features adjustment facilities whereby the projecting distance of the tamping bars may be varied in order to vary the initial loading of the compression springs associated with the tamping assembly in accordance with the vibrating load requirements. Also, stroke adjusting facilities are provided in order to regulate the vibrational amplitude. In connection with the stroke adjusting facilities, means are provided for adjusting the position of the prime mover on the frame so as to maintain the proper tension in the belt drive which drivingly interconnects the prime mover with the tamping assembly. The mobile frame therefore is provided with handles whereby its movement may be guided and on which the selective controls are made available to the operator in order to selectively render the tamping assembly operative and to propel the mobile frame when desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a front elevational view of the vibrating machine.

FIGURE 4 is a partial sectional view taken substantially through a plane indicated by section line 4—4 in FIGURE 3.

FIGURE 5 is a partial sectional view taken substantially through a plane indicated by section line 5—5 in FIGURE 4.

Figure 1:
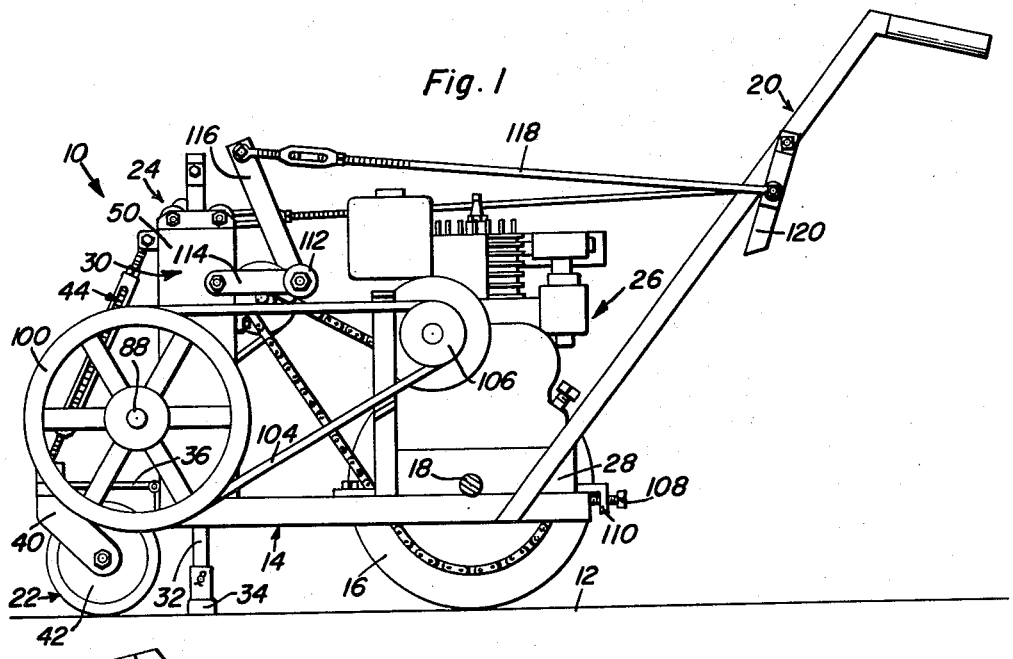
FIGURE 1 is a side elevational view of the vibrating machine as seen from one side.
Figure 2:
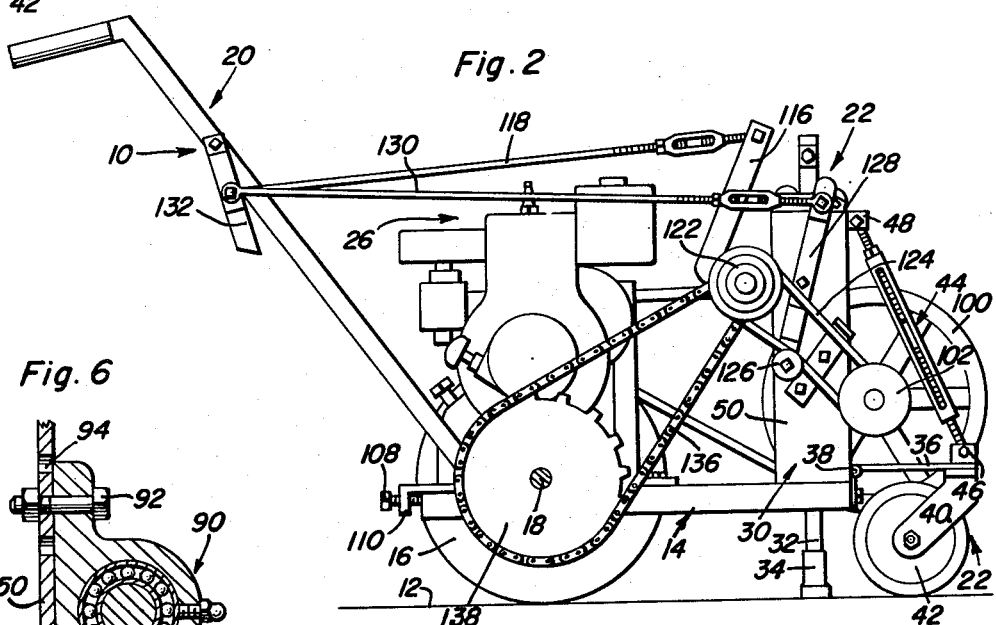
FIGURE 2 is a side elevational view of the vibrating machine as seen from the other side.

Referring now to the drawings in detail, it will be observed from FIGURES 1, 2 and 3 that the vibrating machine generally referred to by reference numeral 10 is supported on a surface 12 adapted to be vibrated thereby. The machine is therefore supported in spaced relation above the surface 12 by means of a mobile frame assembly generally referred to by reference numeral 14. A pair of traction wheels 16 support the mobile frame assembly above the surface 12 adjacent the rear portion of the machine by means of an axle 18 to which the traction wheels are connected. Thus, a rotational axis fixed relative to the mobile frame 14 is established by the axle 18 about which the traction wheels are rotated in order to propel the mobile frame forwardly. Connected to the mobile frame 14 and extending upwardly and rearwardly therefrom, are a pair of handle assemblies 20 by means of which an operator may guide movement of the mobile frame. The forward end portion of the mobile frame is supported in adjustably spaced relation above the surface 12 by means of a dirigible caster wheel assembly generally referred to by reference numeral 22. Also mounted adjacent the forward end of the mobile frame is a tamping assembly generally refererd to by reference numeral 24 adapted to be driven by a prime mover in the form of an internal combustion engine 26 of conventional design, said engine being mounted between the traction wheels 16 and above the axle 18 by means of an adjustable base assembly 28.

The tamping assembly 24 is fixedly mounted adjacent the forward end of the mobile frame 14 by means of a guide frame assembly generally referred to by reference numeral 30 as more clearly seen in FIGURES 1 and 2. A plurality of pressure bars 32 project an adjustable distance below the mobile frame so that the tamping elements 34 removably connected to the lower ends of the pressure bars may engage the surface 12. Accordingly, the forward end portion of the mobile frame is adjustably spaced above the surface 12 by means of the dirigible caster wheel assembly 22. The caster wheel assembly therefore includes a mounting plate 36 projecting forwardly from the frame and hingedly connected thereto by the hinge 38 a portion of which is secured to the forward end of the mobile frame 14. Rotatably mounted about a vertical axis adjacent the forward end of the mounting plate 36, is the wheel frame assembly 40 upon which the caster wheel 42 is rotatably mounted. It will therefore be appreciated, that the mobile frame 14 may be steered because of the angular movement of the wheel frame 40 about its vertical axis relative to the mounting plate 36. The position of the mounting plate about the horizontal axis established through the hinge 38, is therefore adjusted so as to adjustably space the forward end portion of the mobile frame above the surface 12. A positioning turnbuckle device 44 is therefore provided and is pivotally connected to the mounting plate 36 by the clevis element 46. The upper end of the turnbuckle device is pivotally connected to the lugs 48 which project forwardly from the upper portion of the guide frame assembly 30 that mounts the components of the tamping assembly 22.

Figure 6:
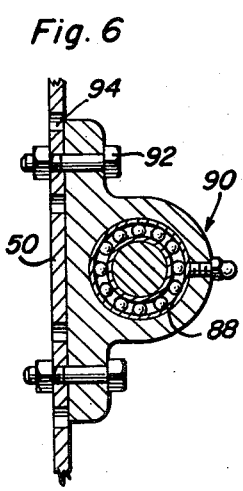
FIGURE 6 is a partial sectional view taken substantially through a plane indicated by section line 6—6 in FIGURE 3.

As more clearly seen in FIGURES 4, 5 and 6, the guide frame assembly for the tamping assembly is formed by a pair of laterally spaced vertical channel frame members 50 interconnected at the upper end by an upper horizontal channel frame member 52 and at the lower end by the lower channel frame member 54. The upper and lower channel frame members 52 and 54 are provided with openings through which the pressure bars 32 are slidable and also mount thereon a plurality of bearing assemblies 56 and 58 respectively for reciprocably guiding movement of the pressure bars 32. Each of the roller bearing assemblies 56 and 58 therefore includes a pair of upstanding bracket elements 60 disposed on opposite sides of an associated pressure bar for rotatably mounting a pair of guide rollers 62 that engage the pressure bar. As heretofore indicated, the lower end portion of the pressure bar projects below the lower frame member 54 so that the tamping element 34 removably connected thereto by the pin 64 may engage the surface 12. The upper ends of the pressure bars have connected thereto limiting plate elements 66 which are connected to the pressure bars by the fasteners 68 so that the plate elements will prevent disassembly of the pressure bars from the guide frame assembly by abutting against the upper edges of the guide roller brackets 60. However, when the tamping elements at the lower ends of the pressure bars are in engagement with the supporting surface 12, the pressure bars will project above the guide frame assembly 30 with compression spring elements 70 being initially loaded by an amount depending upon the distance that the pressure bars project below the adjustably positioned mobile frame. The compression spring elements 70 are disposed about the associated pressure bars 32 and react between sleeve elements 72 fixed to the pressure bars and sleeve elements 74 fixed to the upper frame member 52. Also fixedly mounted intermediate the upper and lower ends of the pressure bars, are lift follower assemblies 76 which include a pair of mounting brackets 78 secured to the pressure bars by the fastener assemblies 80 and rotatably mounting therebetween follower roller elements 82. The lift assemblies 76 are therefore adapted to be engaged by a stroke-imparting mechanism generally referred to by reference numeral 84.

The stroke-imparting mechanism includes a camshaft 86 having end portions 88 which are circular in cross section so that the camshaft may be rotatably supported in adjustable position on the guide frame assembly 30 by means of a pair of adjustable journal block assemblies 90. As more clearly seen in FIGURES 5 and 6, the journal block assemblies 90 are mounted in vertically adjustable position on the channel frame members 50 by means of the spaced fastener assemblies 92 which extend through selected adjustment apertures 94 formed in the frame members 50 for such purpose. Accordingly, the non-circular intermediate portion 96 of the camshaft will be disposed between the journal assemblies 90 so as to mount thereon a plurality of circumferentially and axially spaced lift pins 98 which project from the camshaft and engage the lift follower assemblies 76 on the pressure bars 32 in order to impart a reciprocatory stroke thereto. By vertically adjusting the position of the journal assemblies 90 so as to adjust the position of the rotational axis through the camshaft 86, the reciprocatory stroke of the pressure bars 32 relative to the frame may be varied in accordance with amplitude requirements. The force with which the tamping elements at the lower ends of the pressure bars engage the surface 12 on the other hand, will depend upon the initial loading of the compression springs 70, this initial loading being determined by the adjustable spacing of the frame above the surface 12 by means of the turnbuckle device 44 as hereinbefore described. Thus, it will be apparent that operation of the tamping assembly 22 will be effected upon rotation being imparted to the camshaft 86. A driven pulley wheel 100 is therefore connected to one end portion 88 of the camshaft so that drive may be imparted to the camshaft from the prime mover 26. The other end portion of the camshaft has connected thereto a pulley wheel 102 so that when the tamping assembly 22 is operative, drive may then also be transmitted to the traction wheels 16.

As more clearly seen in FIGURES 1, 2 and 3, transmission means is provided between the prime mover 26 and the tamping assembly and between the tamping assembly and the traction wheels. Accordingly, the driven wheel 100 is drivingly connected by means of the endless friction belt 104 to the drive pulley 106 connected to the output shaft of the engine 26. The engine is mounted on the adjustable base 28 as aforementioned so that the tension of the drive belt 104 may be regulated to the proper value in accordance with the adjustable vertical position of the driven pulley wheel 100 connected to the camshaft end portion 88. The base 28 is therefore adjustably secured in position by means of an adjustable screw element 108 threadably mounted by a projecting portion 110 of the base. The base may then be secured in adjusted position by a plurality of bolt assemblies extending through slots in the mobile frame assembly 14 (not shown). As illustrated in FIGURE 1, the belt 104 will be in an untensioned condition so as to not be effective to transmit drive from the engine 26 to the driven pulley 100. In order to render the drive operative, a belt tightening roller 112 is pivotally mounted by the arm 114 on the guide frame assembly 30 and interconnected by the link 116 to the turnbuckle adjustable cam control rod 118. Accordingly, a control lever 120 is pivotally mounted on one of the handle assemblies 20 to which the control rod 118 is pivotally connected so that upon pivotal displacement of the control lever 120 counterclockwise as viewed in FIGURE 1, to a locked position against the handle bar assembly, the belt tightening roller 112 will be brought downwardly into belt displacing condition so as to operatively tension the belt 104 in order to render the drive effective. The engine 26 will then be operative to impart rotation to the camshaft in order to operate the tamping assembly as hereinbefore indicated. When the tamping assembly is being driven, drive may also then be imparted to the traction wheels in order to propel the mobile frame forwardly. Accordingly, the driven pulley 102 as more clearly seen in FIGURES 2 and 3, is of the multi-sheave type in order to provide a variable speed ratio drive connection to the intermediate multi-sheave pulley 122 interconnected with the pulley 102 by the belt 124. A belt tightener roller 126 is therefore rotatably mounted at the lower end of a belt tightener lever 128 which is pivotally mounted on the guide frame assembly 30. The upper end of the belt tightener lever 128 is therefore pivotally connected to one end of the adjustable drive control rod 130 connected at its other end to the drive control lever 132 pivotally mounted on the other of the handle bars of the handle bar assembly 20. Accordingly, upon displacement of the drive control lever 132 in a clockwise direction as viewed in FIGURE 2, the belt 124 may be properly tensioned so as to render effective the drive connection established by the belt 124. Rotation may therefore be imparted to the pulley wheel assembly 122 when the tamping assembly is operative. The pulley wheel 122 therefore has connected thereto a sprocket 134 operatively connected by the endless chain 136 to a driven sprocket wheel 138 fixed to the axle 18 so as to impart rotation to the traction wheel 16. It will therefore be apparent from the foregoing, that both operation of the tamping assembly and drive of the mobile frame may be interrupted by driving disengagement of the belt 104 through the control rod 118. However, operation of the tamping assembly and movement of the mobile frame may be effected sequentially through the control rods 118 and 130.

From the foregoing description, the construction, operation and utility of the vibrating machine of the present invention will be apparent. It will therefore be appreciated that the vibrating machine involves an advantageous arrangement of parts whereby adjusted and controlled vibration is imparted to any surface such as a roof in accordance with various load and displacement requirements. It will also be appreciated, that because of the relative arrangement of parts handling and control of the machine is facilitated as well as repair and adjustment thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vibrating machine for loosening material adhering to a roof surface or the like comprising, a frame assembly, traction wheel means rotatably mounted by the frame assembly about an axis fixed thereto, dirigible wheel means hingedly mounted by the frame assembly in spaced relation to the traction wheel means for adjustable support of the frame assembly, reciprocable tamping means mounted by the frame assembly adjacent to the dirigible wheel means for adjustable support thereabove, adjustable stroke producing means mounted by the frame assembly above the dirigible wheel means for imparting an adjustably varied stroke to the tamping means relative to the frame assembly, means operatively connecting the dirigible wheel means to the frame assembly for adjusting the loading of the tamping means on the surface supporting the traction wheel means and the dirigible wheel means, power means mounted on the frame assembly above the traction wheel means, and selectively controlled transmission means drivingly connecting the power means to the tamping means and the traction wheel means for reciprocating the tamping means and propelling the frame assembly.

2. The combination of claim 1, wherein said tamping means comprises, a guide assembly fixedly mounted on the frame assembly, a plurality of parallel bars slidably mounted by the guide assembly and projecting an adjustably varied distance below the frame assembly, tamping elements removably mounted at lower ends of said bars for load engagement with said surface, lift roller means fixedly mounted by each bar for engagement by the stroke producing means, and spring means operatively engaging the bars and the guide assembly in an initially loaded condition with the tamping elements engaging said surface.

3. The combination of claim 2, wherein said stroke producing means comprises, a camshaft having end portions and a non-circular intermediate portion, vertically adjustable journal means mounted on the guide assembly for rotatably mounting said end portions of the camshaft, a plurality of circumferentially and axially spaced lift pins mounted on said intermediate portion of the camshaft for engagement with the tamping means in response to rotation of the camshaft, and a driven element connected to one of the end portions of the camshaft for imparting rotation thereto.

4. The combination of claim 3, wherein said transmission means comprises, belt drive means rendered operative to drivingly connect said power means to the driven element of the stroke producing means, flexible drive means rendered operative to drivingly connect the stroke producing means to the traction wheel means, and drive engaging control means mounted on the frame assembly and selectively operative to simultaneously render the belt drive means and the flexible drive means inoperative and sequentially render the belt drive means and the flexible drive means operative.

5. The combination of claim 4 including adjustable base means adjustably mounting the power means on the frame assembly for regulating the tension of the belt drive means in accordance with the adjustment of said vertically adjustable journal means.

6. The combination of claim 1, wherein said stroke producing means comprises, a camshaft having end portions and a non-circular intermediate portion, vertically adjustable journal means mounted on the frame assembly for rotatably mounting said end portions of the camshaft, a plurality of circumferentially and axially spaced lift pins mounted on said intermediate portion of the camshaft for engagement with the tamping means in response to rotation of the camshaft, and a driven element connected to one of the end portions of the camshaft for imparting rotation thereto.

7. The combination of claim 6, wherein said transmission means comprises, belt drive means rendered operative to drivingly connect said power means to the driven element of the stroke producing means, flexible drive means rendered operative to drivingly connect the stroke producing means to the traction wheel means, and drive engaging control means mounted on the frame assembly and selectively operative to simultaneously render the belt drive means and the flexible drive means inoperative and sequentially render the belt drive means and the flexible drive means operative.

8. The combination of claim 7 including adjustable base means adjustably mounting the power means on the frame assembly for regulating the tension of the belt drive means in accordance with the adjustment of the adjustable journal means.

9. The combination of claim 1, wherein said transmission means comprises, belt drive means rendered operative to drivingly connect said power means to the stroke producing means, flexible drive means rendered operative to drivingly connect the stroke producing means to the traction wheel means, and drive engaging control means mounted on the frame assembly and selectively operative to simultaneously render the belt drive means and the flexible drive means inoperative and sequentially render the belt drive means and the flexible drive means operative.

10. A vibrating machine for loosening material adhering to a surface comprising, a rigid frame assembly, traction wheels rotatably mounted by the frame assembly about an axis fixed thereto, caster wheel means pivotally mounted by the frame assembly in forward spaced relation to the traction wheels for adjustable support of the frame assembly, tamping means mounted by the frame assembly in rearward adjacency to the caster wheel means for support thereof in a loaded condition, stroke producing means mounted by the frame assembly for imparting movement to the tamping means relative to the frame assembly, means operatively connecting the caster wheel means to the frame assembly for adjusting the loading of the tamping means on the surface supporting the traction wheels and the caster wheel means, power means mounted on the frame assembly and operatively connected to the traction wheels and the stroke producing means, and selective control means for simultaneously interrupting drive of the tamping means and propulsion of the frame assembly by the power means.

References Cited by the Examiner
UNITED STATES PATENTS

| | | | |
|---|---|---|---|
| 1,953,825 | 4/34 | Finley et al. | 94—49 |
| 2,659,281 | 11/53 | Lucas | 94—49 |
| 2,730,028 | 1/56 | Oswalt | 94—48 X |

BROUGHTON G. DURHAM, *Primary Examiner.*

MILTON KAUFMAN, *Examiner.*